United States Patent
Hu

(10) Patent No.: US 8,536,727 B2
(45) Date of Patent: Sep. 17, 2013

(54) WIND ENERGY GENERATING SYSTEM

(76) Inventor: Suey-Yueh Hu, Kaohsiung (TW)

( * ) Notice: Subject to any disclaimer, the term of this patent is extended or adjusted under 35 U.S.C. 154(b) by 343 days.

(21) Appl. No.: 13/020,291

(22) Filed: Feb. 3, 2011

(65) Prior Publication Data

US 2012/0200085 A1    Aug. 9, 2012

(51) Int. Cl.
*F03D 11/00* (2006.01)
(52) U.S. Cl.
USPC .......................................................... 290/55
(58) Field of Classification Search
USPC .......................................................... 290/55
See application file for complete search history.

(56) References Cited

U.S. PATENT DOCUMENTS

| | | | | |
|---|---|---|---|---|
| 4,291,235 | A * | 9/1981 | Bergey et al. | 290/55 |
| 7,245,039 | B2 * | 7/2007 | DuHamel | 290/44 |
| 7,425,776 | B2 * | 9/2008 | Ketcham | 290/55 |
| 7,462,950 | B2 * | 12/2008 | Hu | 290/55 |
| 8,096,773 | B2 * | 1/2012 | Chang | 416/169 R |
| 2003/0235498 | A1 * | 12/2003 | Boatner | 416/119 |
| 2007/0189889 | A1 * | 8/2007 | Yokoi | 415/4.4 |
| 2008/0309090 | A1 * | 12/2008 | Stern et al. | 290/55 |
| 2009/0284018 | A1 * | 11/2009 | Ellis | 290/55 |
| 2009/0302614 | A1 * | 12/2009 | Ireland | 290/55 |
| 2010/0013233 | A1 * | 1/2010 | Buhtz | 290/55 |
| 2010/0013238 | A1 * | 1/2010 | Jessie et al. | 290/55 |
| 2011/0025070 | A1 * | 2/2011 | Price | 290/55 |
| 2011/0148116 | A1 * | 6/2011 | Halstead | 290/52 |

FOREIGN PATENT DOCUMENTS

| | | | |
|---|---|---|---|
| JP | 2005113896 A | * | 4/2005 |
| TW | M327416 | | 2/2008 |

* cited by examiner

*Primary Examiner* — Joseph Waks
(74) *Attorney, Agent, or Firm* — Muncy, Geissler, Olds & Lowe, PLLC

(57) ABSTRACT

A wind energy generating system includes a driving unit driving a shaft and a power generating module is connected to the driving unit and includes a first stator and a first rotor which rotates relative to the first stator. A blade is fixed to the first rotor by a link. A solar power unit is fixed to the power generating module. A power storage unit is located in the driving unit and a control unit is connected to the driving unit. A detection unit is electrically connected to the control unit. The first rotor rotates relative to the first stator to generate electric power and the detection unit detects the speed of the blade and adjusts the speed of the shaft to increase the relative speed between the first rotor and the first stator, or to slow the speed of the relative speed to protect the blade.

8 Claims, 4 Drawing Sheets

US 8,536,727 B2

WIND ENERGY GENERATING SYSTEM

FIELD OF THE INVENTION

The present invention relates to a wind energy generating system, and more particularly, to a wind energy generating system that automatically adjusts the relative speed between stators and rotors according to the speed of blades.

BACKGROUND OF THE INVENTION

Due to lack of energy, solar energy and wind energy are used to generate electric power. A conventional wind energy generating system is disclosed in Taiwan Utility Patent No. M327416, which generally includes a wind energy generator, multiple blades and a solar power generator, wherein the wind energy generator has multiple support links which are respectively connected with a sub-frame to reinforce the structural strength. The wind energy generator has a drum-type or disk-type brake unit. The blades each have a curved head and a thin tail. The curved head forms a wind collection area to increase the catch of wind. The solar power generator has a support frame with a panel for collecting sun light to generate electric power. By the solar power generator and the wind energy generator, the electric power can be collected and supplied to the users.

However, when the wind is weak and the night time, the two generators cannot properly function. When the wind is too strong, the blades are easily damaged because the speed of revolution is too high.

SUMMARY OF THE INVENTION

The present invention relates to a wind energy generating system and comprises a driving unit which drives a shaft. A power generating module is connected to the driving unit and has a first stator and a first rotor which rotates relative to the first stator. The first stator is fixed to the shaft and has a first periphery and the first rotor is located around the first periphery. A blade is connected with a link which is fixed to the first rotor. A solar power unit is fixed to the power generating module and a power storage unit is located in the driving unit and electrically connected to the power generating module. A control unit is disposed on the driving unit and electrically connected to the driving unit. A detection unit is electrically connected to the control unit.

At least one support module is connected to the driving unit and has a second stator and a second rotor which rotates relative to the second stator. The second stator is fixed to the shaft and has a second periphery. The second rotor is located around the second periphery. The at least one support module is electrically connected to the power storage unit.

The link of the blade is fixed to the second rotor.

The detection unit is an anemometer or a tachometer.

The first stator has a first top and the first rotor has a second top, the solar power unit is connected to the first and second tops.

The first stator is wrapped with the first induction coil and the first rotor has a first magnet connected thereto.

The second stator is wrapped by the second induction coil and the second rotor has a second magnet connected thereto.

The second rotor has a bottom to which a first permanent magnet is fixedly connected. A stationary disk is fixed to the shaft and located beneath the second rotor. The disk has a third top which has a second permanent magnet which is magnetically repulsive to the first permanent magnet.

The disk has a roller connected thereto and the second rotor has a rail at an underside thereof. The rail is located corresponding to the roller.

The present invention includes the following advantages:

1. The present invention utilizes the relative speed between the stators and the rotors to generate electric power.

2. When the wind is weak, the shaft is rotated by the power generated from the solar power unit and the power increases the relative speed between the stators and the rotors to generate electric power.

3. When the wind is too strong, the shaft is driven to generate resistance between the relative rotation between the stators and the rotors so as to brake the rotation and prevent the blade from being damaged due to over-speed.

4. By the magnetic repulsion between the first and second permanent magnets, the frictional resistance and noise can be reduced when rotation, and the blade keeps in balance during rotation and does not drop off.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
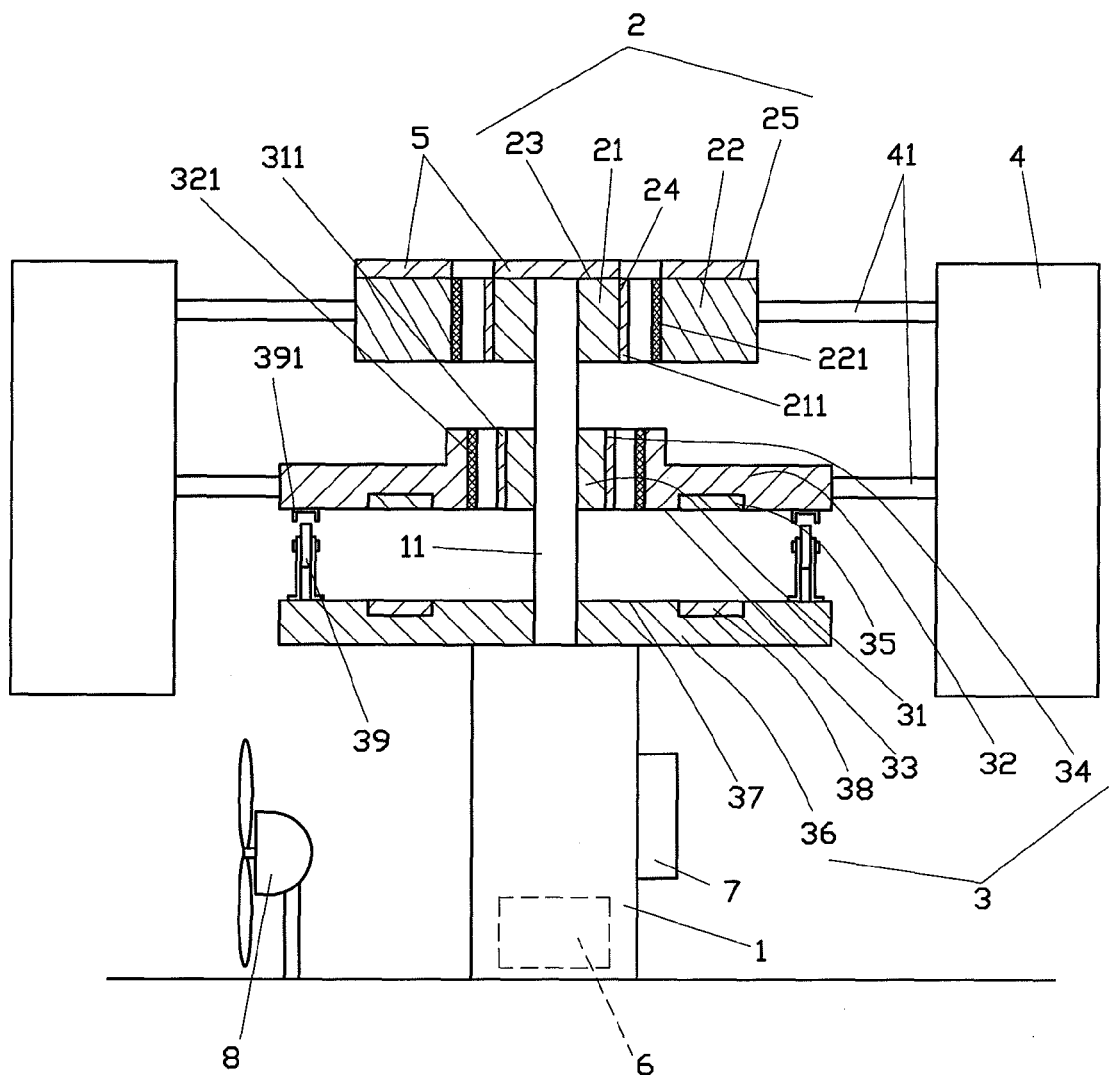
FIG. 1 is a cross sectional view of the wind energy generating system of the present invention.
Figure 2:
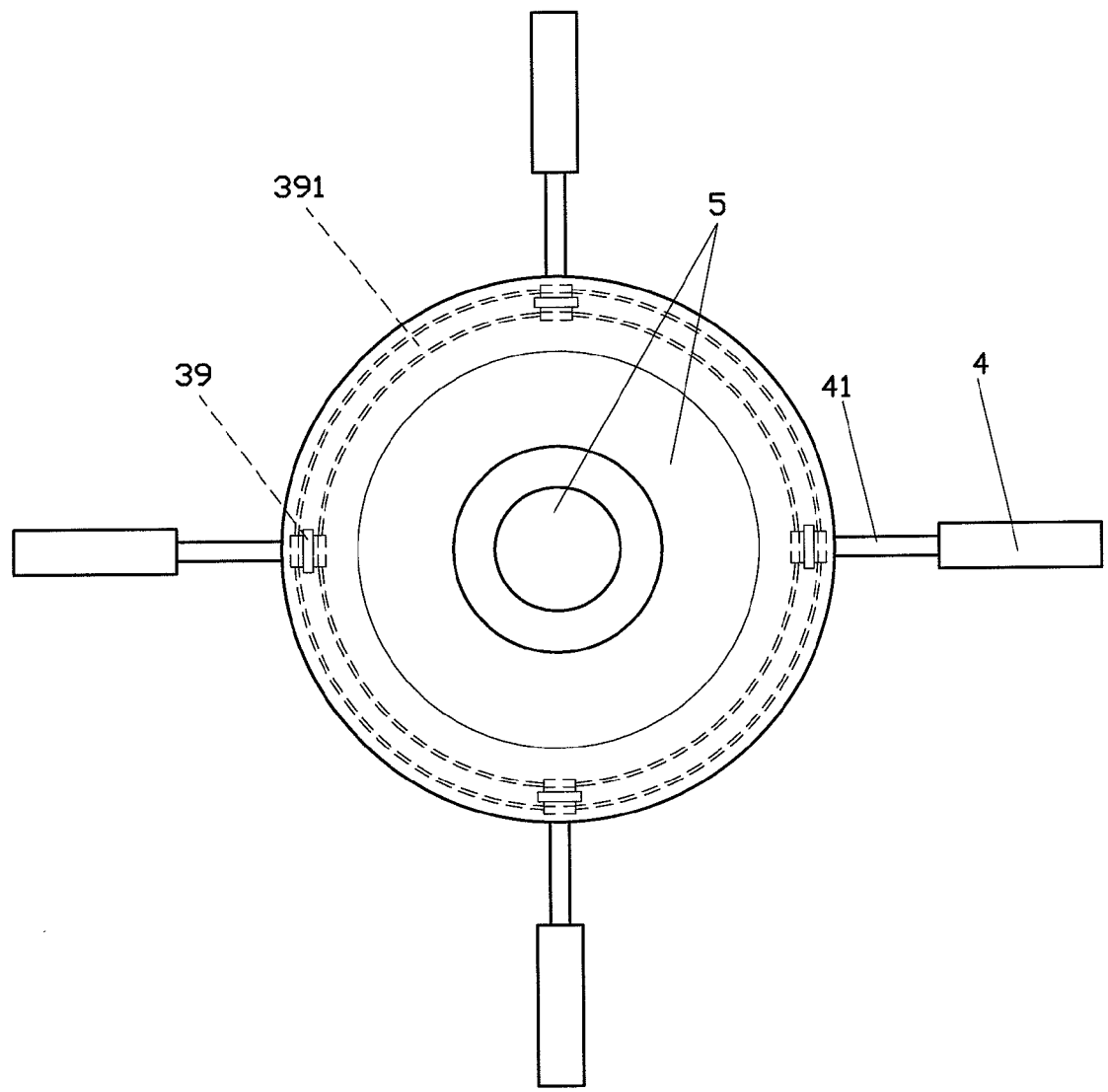
FIG. 2 is a top view of the wind energy generating system of the present invention.

Referring to FIGS. 1 and 2, the wind energy generating system of the present invention comprises a driving unit 1, a power generating module 2, at least one support module 3, multiple blades 4, a solar power unit 5, a power storage unit 6, a control unit 7 and a detection unit 8.

The driving unit 1 drives a shaft 11. The power generating module 2 is connected to the driving unit 1 and has a circular first stator 21 and a first rotor 22 which rotates relative to the first stator 21. The first stator 21 is fixed to the shaft 11 and has a first periphery 24. The first stator 22 is located around the first periphery 24. The first stator 21 has a first top 23. The first stator 21 or the first rotor 22 is wrapped by a first induction coil 211 or is connected with a first magnet 221. In this embodiment, the first stator 21 is wrapped by the first induction coil 211 and the first rotor 22 has the first magnet 221 connected thereto. The relative rotation between the first stator 21 and the first rotor 22 generates electric power. The first rotor 22 has a second top 25.

The at least one support module 3 is connected to the driving unit 1 and has a circular second stator 31 and a second rotor 32 which rotates relative to the second stator 31. The second stator 31 is fixed to the shaft 11 and has a second periphery 34. The second rotor 32 is located around the second periphery 34. The second rotor 32 has a bottom 33 to which a first permanent magnet 35 is fixedly connected. The second stator 31 or the second rotor 32 is wrapped by a second induction coil 311 or is connected with a second magnet 321. In this embodiment, the second stator 31 is wrapped by the second induction coil 311 and the second rotor 32 has the second magnet 321 connected thereto. The relative rotation between the second stator 31 and the second rotor 32 generates electric power. A stationary disk 36 is fixed to the shaft 11 and located beneath the second rotor 32. The disk 36 has a third top 37. The third top 37 has a second permanent magnet 38 which is magnetically repulsive to the first permanent magnet 35. By the magnetic repulsion, a force is generated to keep a distance to keep the second rotor 32 to be balanced and does not drop off. The disk 36 has a roller 39 connected thereto and the second rotor 32 has a rail 391 at an underside thereof. The rail 391 is located corresponding to the roller 39.

The blades 4 each are connected with a link 41 which is fixed to the first rotor 22 and the second rotor 32.

The solar power unit 5 is fixed to the first top 23 of the first stator 21 and the second top 25 of the first rotor 22 so as to transfer the sun light into electric power which is sent to the driving unit 1 to provide energy for rotating the shaft 11.

The power storage unit 6 is located in the driving unit 1 and electrically connected to the power generating module 2 and the support module 3 to store the electric energy from the power generating module 2.

The control unit 7 is disposed on the driving unit 1 and electrically connected to the driving unit 1 so as to receive signals from the driving unit 1 and control the speed of revolution of the shaft 11.

The detection unit 8 is electrically connected to the control unit 7 and is an anemometer for detection of the speed of the wind, or a tachometer for detection of the speed of the revolution of the blade 4 and then sending a signal. In this embodiment, the detection unit 8 is a tachometer.

Figure 3:
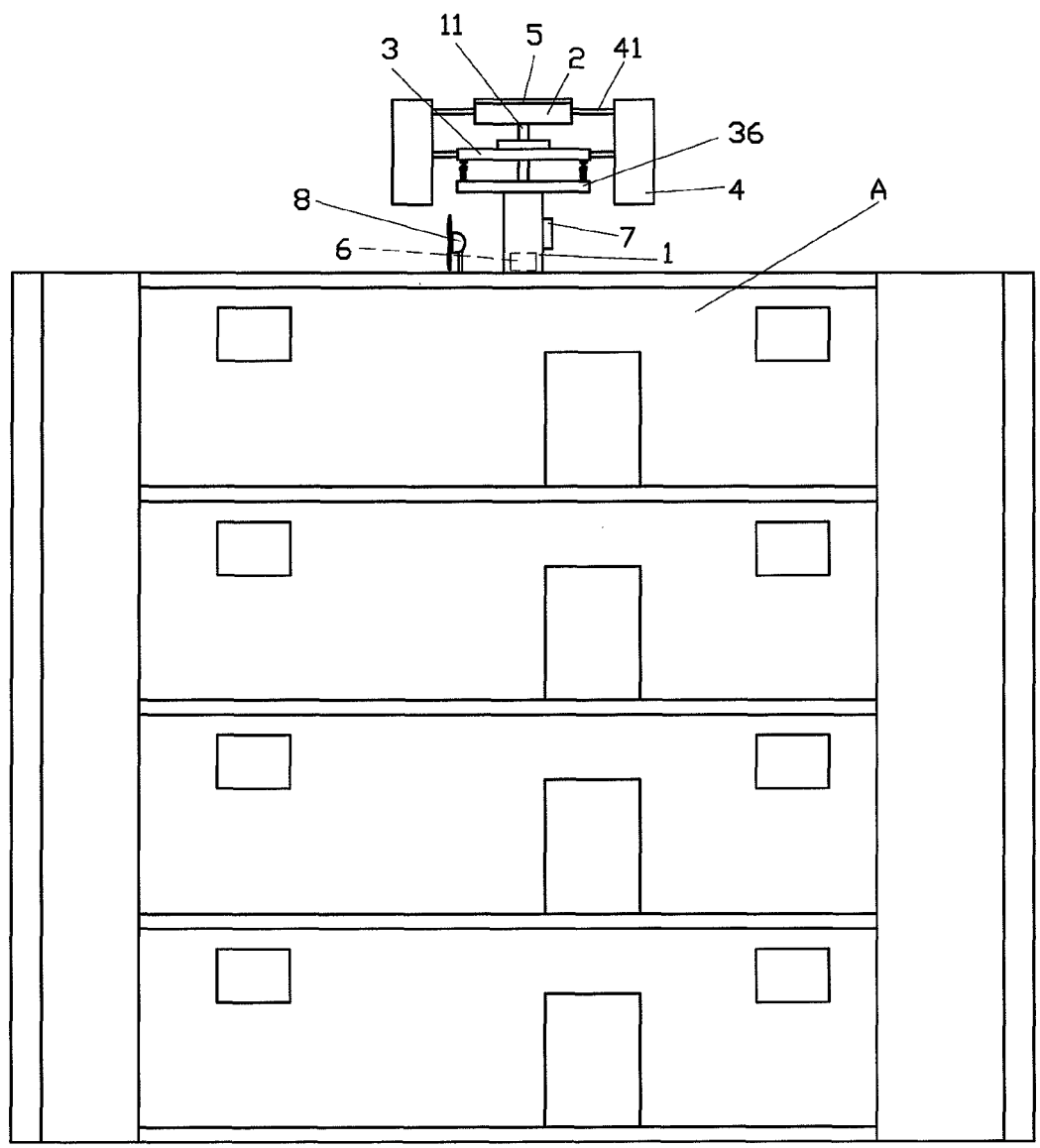
FIG. 3 shows that the wind energy generating system of the present invention is installed to the top of a building.

When in use, as shown in FIGS. 1 and 3, the driving unit 1 is fixed to a ship, island or the top of a building "A". When the blades 4 are rotated by wind, the links 41 drive the first and second rotors 22, 32. The first rotor 22 is rotated relative to the first stator 21. The first induction coil 211 and the first magnet 221 cut the magnetic lines and generate induction power which is sent to the power storage unit 6 to be stored or output to work. The second rotor 32 is rotated relative to the second stator 31. The second induction coil 311 and the second magnet 321 cut the magnetic lines and generate induction power which is sent to the power storage unit 6 to be stored. When the blades 4 rotate, the second permanent magnet 38 of the disk 36 generates a magnetic repulsive force relative to the first permanent magnet 35 so as to reduce the frictional resistance and noise, and the second rotor 32 can be kept a distance and spinning. Accordingly, the blades 4 keep balance while spinning and do not drop off.

When the wind is weak and the detection unit 8 detects that the speed of the blades 4 is less than 30 RPM, a signal is sent to the control unit 7 which receives the signal and controls the shaft 11 to rotate. In the meanwhile, the solar power unit 5 provides electric power to drive the shaft 11 which accelerates the rotational speed of the first stator 21 relative to the first rotor 22, and the shaft 11 also accelerates the rotational speed of the second stator 31 relative to the second rotor 32. The electric power is generated by cutting the magnetic lines and supplied continuously to the storage unit 6 to be stored or to be output to work. Therefore, the generating process is not stopped due to weak wind.

When the wind is too strong, the detection unit 8 detects that the speed of the blades 4 is over 150 RPM, a signal is sent to the control unit 7 which receives the signal and controls the shaft 11 to rotate. The shaft 11 accelerates the rotational speed of the first stator 21 relative to the first rotor 22, and the shaft 11 also accelerates the rotational speed of the second stator 31 relative to the second rotor 32. The relative speed generates resistance which performs a braking function to reduce the speed of the first rotor 22 and the speed of the second rotor 32, so as to avoid the blades 4 from being damaged due to high speed.

If the second rotor 32 is lowered because of too heavy, the rail 391 at the bottom 33 of the second rotor 32 is cooperated with the roller 39 to reduce the friction and provide support force to keep the blades 4 spinning.

Figure 4:
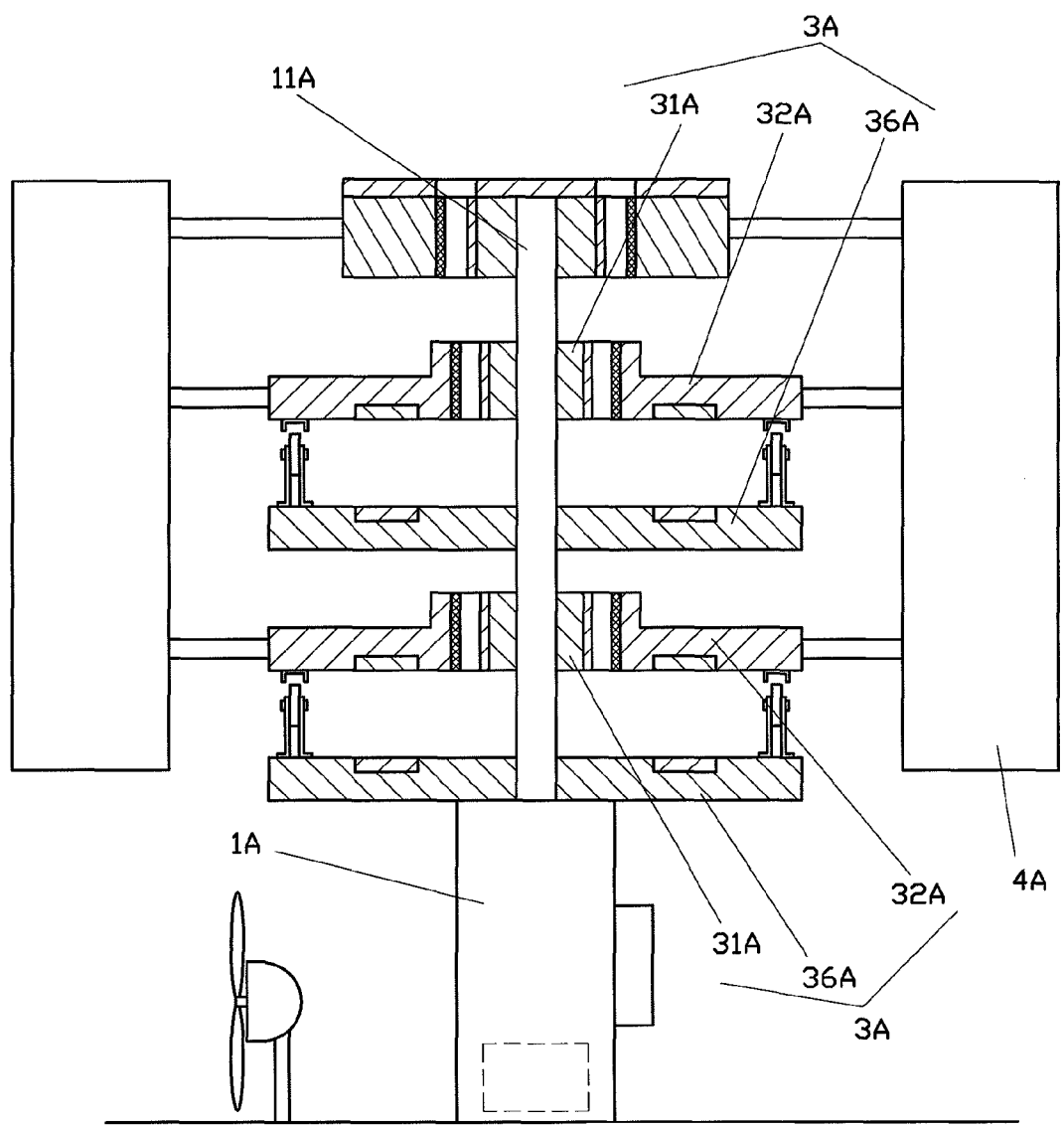
FIG. 4 shows another embodiment of the wind energy generating system of the present invention wherein two support modules are included.

Another embodiment of the present invention is disclosed in FIG. 4, wherein there are two sets of support modules 3A connected to the shaft 11A of the driving unit 1A. Each set of the support module 3A includes a second stator 31A, a second rotor 32A and a disk 36A so as to connect the blades 4A of different lengths and areas.

While we have shown and described the embodiment in accordance with the present invention, it should be clear to those skilled in the art that further embodiments may be made without departing from the scope of the present invention.

What is claimed is:

1. A wind energy generating system comprising:
a driving unit which drives a shaft;
a power generating module connected to the driving unit and having a first stator and a first rotor which rotates relative to the first stator, the first stator fixed to the shaft and having a first periphery, the first rotor located around the first periphery;
a blade connected with a link which is fixed to the first rotor;
a solar power unit fixed to the power generating module;
a power storage unit located in the driving unit and electrically connected to the power generating module;
a control unit disposed on the driving unit and electrically connected to the driving unit, and
a detection unit electrically connected to the control unit,
wherein the link of the blade is fixed to the second rotor.

2. The system as claimed in claim 1, further comprising at least one support module, the at least one support module being connected to the driving unit and having a second stator and a second rotor which rotates relative to the second stator, the second stator being fixed to the shaft and having a second periphery, the second rotor being located around the second periphery, the at least one support module being electrically connected to the power storage unit.

3. The system as claimed in claim 2, wherein the second stator is wrapped with the second induction coil and the second rotor has a second magnet connected thereto.

4. The system as claimed in claim 2, wherein the second rotor has a bottom to which a first permanent magnet is fixedly connected, a stationary disk is fixed to the shaft and located beneath the second rotor, the disk has a third top which has a second permanent magnet which is magnetically repulsive to the first permanent magnet.

5. The system as claimed in claim 4, wherein the disk has a roller connected thereto, the second rotor has a rail at a bottom thereof, and the rail is located corresponding to the roller.

6. The system as claimed in claim 1, wherein the detection unit is an anemometer or a tachometer.

7. The system as claimed in claim 1, wherein the first stator has a first top and the first rotor has a second top, a section of the solar power unit is connected to the first top and a section of the solar power unit is connected to the second top.

8. The system as claimed in claim 1, wherein the first stator is wrapped by the first induction coil and the first rotor has a first magnet connected thereto.

* * * * *